(12) United States Patent
Farook (10) Patent No.: US 11,772,970 B1
(45) Date of Patent: Oct. 3, 2023

(54) SULFUR RECOVERY UNIT OXIDATION AIR MANAGEMENT DURING SUPERCLAUS TO CLAUS SWITCHING

(71) Applicant: SAUDI ARABIAN OIL COMPANY, Dhahran (SA)

(72) Inventor: Farshad Farook, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/838,002

(22) Filed: Jun. 10, 2022

(51) Int. Cl.
*C01B 17/04* (2006.01)

(52) U.S. Cl.
CPC ........ *C01B 17/043* (2013.01); *C01B 17/0417* (2013.01); *C01B 17/0447* (2013.01); *C01B 17/0452* (2013.01)

(58) Field of Classification Search
CPC .............. C01B 17/0404; C01B 17/043; C01B 17/0452; C01B 17/0447; C01B 17/0417; G05B 1/00; G05B 15/00; G05B 19/00; G05D 7/00; G05D 21/00; G05D 23/00
See application file for complete search history.

(56) References Cited

U.S. PATENT DOCUMENTS

| | | | | |
|---|---|---|---|---|
| 3,532,468 A | * | 10/1970 | Beavon | C01B 17/0404 423/580.1 |
| 3,822,341 A | * | 7/1974 | Smith | C01B 17/0404 423/574.1 |
| 4,100,266 A | * | 7/1978 | Smith | C01B 17/0452 423/DIG. 5 |
| 4,836,999 A | * | 6/1989 | Reed | C01B 17/0413 436/143 |
| 5,266,274 A | | 11/1993 | Taggart et al. | |
| 8,597,581 B2 | | 12/2013 | Naphad et al. | |
| 10,195,565 B2 | | 2/2019 | Heisei et al. | |
| 10,835,857 B2 | | 11/2020 | Nasato | |
| 10,995,949 B2 | | 5/2021 | Schreiner et al. | |
| 2018/0065851 A1 | * | 3/2018 | Rameshni | B01D 53/0462 |

* cited by examiner

*Primary Examiner* — Timothy C Vanoy
(74) *Attorney, Agent, or Firm* — Osha Bergman Watanabe & Burton LLP (57) ABSTRACT

Described is a control process for oxidation air management in a sulfur recovery unit. The sulfur recovery unit includes a gas feedstock inlet, an oxidation air inlet, a reaction furnace, pre-heaters, a Claus section including multiple sulfur condensers and Claus converters, and a SuperClaus section including a catalyzing SuperClaus converter, a SuperClaus sulfur condenser, and an SuperClaus oxidation air flow control valve. The control process includes analyzing one or more parameters in the sulfur recovery unit to determine a switch from the SuperClaus section to the Claus section. Additionally, conditions in the sulfur recovery unit are continuously monitored so that when a condition reaches a predetermined threshold or range, the SuperClaus oxidation air flow control valve to the SuperClaus section is opened.

16 Claims, 5 Drawing Sheets

SULFUR RECOVERY UNIT OXIDATION AIR MANAGEMENT DURING SUPERCLAUS TO CLAUS SWITCHING

BACKGROUND

A Sulfur Recovery Unit (SRU) receives $H_2S$ and converts $H_2S$ to elemental sulfur through the Claus reaction. The Claus reaction includes two or three stages, and the conversion of $H_2S$ in a Claus plant is limited due to the thermodynamics of the Claus equilibrium reaction. The SuperClaus process involves bulk sulfur conversion in a conventional Claus section, followed by selective oxidation of the remaining $H_2S$ by $O_2$ to elemental sulfur. The selective oxidation is achieved with a SuperClaus catalyst that does not promote the Claus equilibrium reaction and, instead, prevents oxidation to $SO_2$ of the elemental sulfur formed with a catalyst that is selective for the oxidation of $H_2S$.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a control system for oxidation air management in a sulfur recovery unit.

In another aspect, embodiments disclosed herein relate to a control process for oxidation air management in a sulfur recovery unit.

Other aspects and advantages of the claimed subject matter will be apparent from the following description and the appended claims.

DETAILED DESCRIPTION

For the purpose of this description, a single reference number will be assigned to a line as well as a stream carried in that line. Same reference numbers refer to similar components. The person skilled in the art will readily understand that while the design is illustrated referring to one or more specific combinations of features and measures many of those features and measures are functionally independent from other features and measures. Such features and measures may be equally or similarly applied independently in other embodiments or combinations.

In conventional sulfur recovery units (SRUs) based on the SuperClaus process, the systems are designed to prevent SuperClaus catalyst deactivation. The general control configuration in a SuperClaus section of an SRU is such that during switching of the trains from SuperClaus to Claus mode, one or more oxidation air valves are set to fully open to prevent SuperClaus catalyst deactivation. However, sudden introduction of oxidation air can cause fire from accumulated liquid sulfur in the piping. The oxidation air can potentially trigger an ignition due to presence of pyrophoric material (e.g., FeS), or due to oxidation air temperature exceeding sulfur auto-ignition temperature. Accordingly, there exists a need for an SRU configuration that closes a SuperClaus oxidation air valve (or valves) during SuperClaus to Claus switching, thereby preventing sulfur fire, over-heating, and damage of process piping and equipment while safeguarding the SuperClaus catalyst from deactivation.

Figure 1:
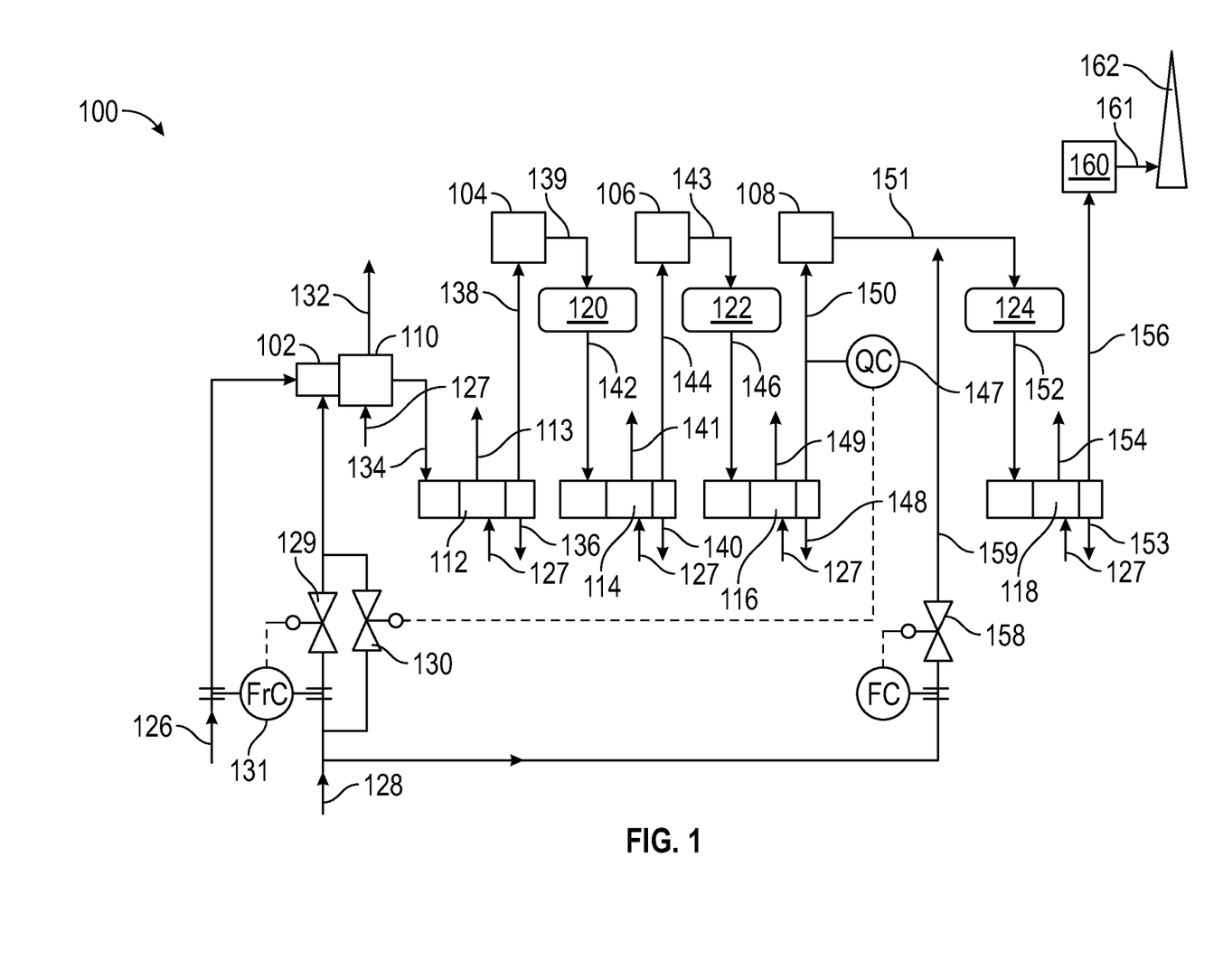
FIG. 1 illustrates a sulfur recovery unit (SRU) according to embodiments of the present disclosure.

In one aspect, embodiments disclosed herein relate to a modified air management in an SRU. An SRU receives Hydrogen Sulfide ($H_2S$) as part of a gas feedstock and converts the $H_2S$ to elemental sulfur through the Claus reaction. FIG. 1 illustrates a diagram of one embodiment of an SRU (100) that includes a SuperClaus process and catalyst. Typically, the primary equipment used in a SRU (100) include a reaction furnace burner (102), multiple re-heaters (104, 106, and 108), which are typically shell and tube exchangers, a waste heat boiler (110), sulfur condensers (112, 114, 116, and 118), catalyzing Claus converters (120, 122), a catalyzing SuperClaus converter (124), heat exchangers, and fluid delivery pipes. The first stage re-heater (104) may also be an auxiliary burner. An acid gas feed (126), received via an inlet, is pre-heated, if required, depending on the $H_2S$ concentration in the feed gas. The pre-heating is performed using a fired heater or a shell and tube exchanger in order to achieve the required minimum reaction furnace temperature. The pre-heated acid gas is then sent to the reaction furnace burner (102) where $H_2S$ undergoes combustion in the presence of oxygen in the combustion air (128), or oxidation air feedstock, received via an oxidation air inlet. The combustion air (128) is also pre-heated using a fired heater (or a combination of fired heater and shell and tube exchanger) prior to admitting to reaction furnace. The combustion air is controlled by valves (129, 130), which may be flow control valves (FCVs). A flow ratio control (FrC) valve (131) may control the stochiometric ratio for combustion based on the flow rate of the acid gas feed (126). In one or more embodiments, one of the valves is a trim air flow control valve (130) and the other is a main air flow control valve (129).

Referring to FIG. 1, the process gas (134) to the first stage sulfur condenser (112) is produced in the reaction furnace burner (102) where the acid gas feed (126) $H_2S$ mixes proportionally with the combustion air (128). The temperature of the process gas (134) in the reaction furnace burner (102) may be in the range of 1900-2200° F. In embodiments where ammonia is present in the acid gas feed, the temperature of the process gas (134) in the reaction furnace burner (102) may be over 2300° F. for destruction. Boiler feed water (BFW) (127) may be introduced in the waste heat boiler (110) (or steam drum) thereby cooling the process gas (134) to a temperature in the range of 600-650° F. and producing a high/medium pressure steam (132). Depending on the SRU configuration and BFW (127) pressure, high/medium pressure steam (132) may be generated using the waste heat boiler (110).

Once the process gas (134) is cooled to, for example, 175-180° C. (350-360° F.) in the first stage sulfur condenser (112), a first liquid sulfur (136) may be condensed, separated, and flow to a sulfur pool, and a first low-pressure (LP) steam (113) may be produced. A first non-condensed process gas (138) may be produced from the first stage sulfur condenser (112). The remaining mixture of $H_2S$ and sulfur dioxide ($SO_2$) in the first non-condensed process gas (138) may be fed to a Claus reaction system to form additional elemental sulfur. The gases may be heated to approximately 210-220° C. (410-430° F.). Once equilibrium conditions are reached, the elemental sulfur is removed before the gases are passed to the following reactor stage. The elemental liquid sulfur is removed via stages of condensation with the sulfur condensers (112, 114, 116, and 118) followed by catalytic reactions via the catalyzing Claus converters (120, 122) and the SuperClaus converter (124) to increase sulfur recovery rates, as described below.

Accordingly, in one or more embodiments, the first non-condensed process gas (138) from the first stage sulfur condenser (112) may be heated to about 210-220° C. (410-430° F.) in a first stage re-heater (104), producing a first heated process gas stream (139). The first heated process gas stream (139) may then be sent to a first Claus converter (120), where the $H_2S$ in the first heated process gas stream (139) may be converted to elemental sulfur, producing a second process gas stream (142). BFW (127) may be introduced in the second stage sulfur condenser (114), thereby cooling the second process gas stream (142) to about 175° C. (350° F.). A second liquid sulfur (140) may be condensed, separated, and flow to the sulfur pool, producing a second low-pressure (LP) steam (141).

A second non-condensed process gas (144) from the second stage sulfur condenser (114) may be re-heated to approximately 210-220° C. (410-430° F.) in a second stage re-heater (106), producing a second heated process gas stream (143). The second heated process gas stream (143) may then be sent to a second Claus converter (122). The $H_2S$ in the second heated process gas stream (143) may be converted to elemental sulfur, producing a third process gas stream (146). The third process gas stream (146) may be cooled to about 150° C. (300° F.) in a third stage sulfur condenser (116). A third liquid sulfur (148) may be condensed, separated, and flow to the sulfur pool, producing a third low-pressure (LP) steam (149). A QC (quality control) analyzer (147) may function to increase the air/oxygen based on $H_2S$ content downstream of the third stage sulfur condenser (116). In one or more embodiments, the QC analyzer (147) is an online tail gas analyzer. The QC analyzer (147) functions to maintain $H_2S$ concentration at approximately 0.6% to 1.0% volume, such as about 0.8% volume, during SuperClaus mode and a $H_2S:SO_2$ ratio of 2:1 during Claus mode. The QC analyzer (147) is a component of an Advanced Burner Control (ABC) system (illustrated in FIG. 2) which adjusts combustion air (oxygen) based on a feedback signal. The Claus process, as described, is controlled by controlling the ratio of the oxygen (in the combustion air (128)) and the $H_2S$ (in the acid gas feed (126)). Sulfur recovery depends on the ratio of $H_2S$ and $SO_2$ being approximately 2:1 for the Claus reaction. To obtain this ratio, the air control in the SRU needs to be operated with high efficiency.

A third non-condensed process gas (150) from the third stage sulfur condenser (116) may be heated to about 210-220° C. in a third stage re-heater (108), producing a third heated process gas stream (151). The third heated process gas stream (151) may be sent to the catalyzing SuperClaus converter (124), where the $H_2S$ in the third heated process gas stream (151) may be converted to elemental sulfur, producing a fourth process gas stream (152). The fourth process gas stream (152) may be cooled to about 130° C. (265° F.) in a fourth stage sulfur condenser (118), where a fourth liquid sulfur stream (153) may be condensed, separated, and flow to the sulfur pool, and a fourth low-pressure (LP) steam (154) may be produced. A tail gas (156) may also be produced from the fourth stage sulfur condenser (118). In the SuperClaus process, excess $H_2S$ may suppress the conversion to $SO_2$ in the third non-condensed process gas (150). The $H_2S$ left in the third non-condensed process gas (150) may be oxidized with air to form additional sulfur with a different catalyst in the catalyzing SuperClaus converter (124).

Based on an amount or concentration of $H_2S$ in the third heated process gas stream (151), a SuperClaus oxidation air flow control valve (158) may be opened or closed to allow air/oxygen to the SuperClaus converter (124). The introduction of an additional air stream (159) through the SuperClaus oxidation air flow control valve (158) to the SuperClaus converter (124) provides flexibility in the air to acid gas ($H_2S$) control. Any remaining sulfur containing compounds in the tail gas (156) may be sent to an incinerator (160), such as a thermal oxidizer incinerator. The incinerator (160) may burn the remaining sulfur containing compounds in the presence of excess oxygen. Stack gas (161) may then be fed to a thermal oxidizer stack (162) for dispersion to the environment.

Figure 2:
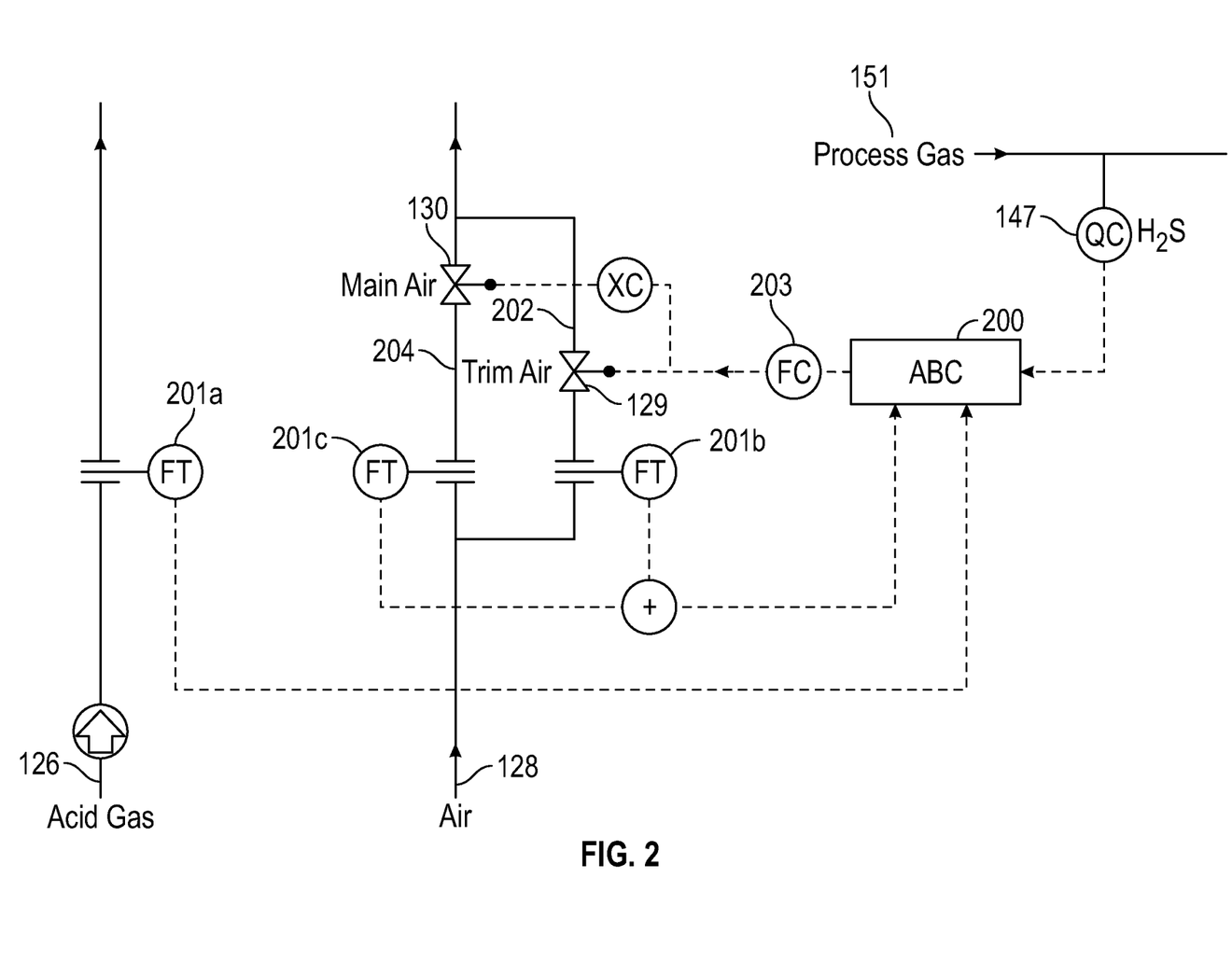
FIG. 2 illustrates an Advanced Burner Control (ABC) of an SRU according to embodiments of the present disclosure.

FIG. 2 illustrates an Advanced Burner Control (ABC) system (200), which controls the combustion air (128) to the reaction furnace burner (FIG. 1, 102). A required quantity of air is calculated by measuring the acid gas feed (126) flow and multiplying the flow with the required ratio of air to acid gas. The ABC system (200) adjusts the position of the main air valve (130) and the trim air valve (129). The ABC system (200) may receive a signal from one or more flow transmitters (FT) (201*a*, 201*b*, 201*c*). The ABC system (200) may determine an amount of air required and send a signal via a flow controller (FC) (203) to open the trim air control valve (129) accordingly. The trim air control valve (129) in the trim air line (202) may be adjusted immediately, while the adjustment of the main valve (129) may follow with a delay. The total air flow through the main air line (204) and the trim air line (202) is determined based on the total amount of acid gas feed in the acid gas feed (126). At equilibrium, approximately 10% of the total air rate flows via the trim air line (202). The ABC system (200) functions to maximize the sulfur recovery rate in order to minimize the $SO_2$ emission. To obtain the highest possible sulfur recovery rate the $H_2S$ concentration of the process gas (FIG. 1, 151) to the SuperClaus converter (FIG. 1, 124) may be equal to, for instance, 0.8 vol. % and is maintained at this value.

When the acid gas feed (126) supplied to the SRU increases, the ABC system (200) may increase the flow of combustion air (128) to the reaction furnace burner (FIG. 1, 102). As both acid gas flow and combustion air flow increase, the calculated flow of tail gas (FIG. 1, 156) increases. The new calculated tail gas flow may be delayed in order to compensate for a small delay in tail gas flow with respect to feed gas flows. The delayed calculated tail gas flow may follow the increase in tail gas flow with a time lag and may be multiplied with the $H_2S$ concentration in the Claus tail gas and the required $O_2$ concentration in the SuperClaus tail gas, thereby obtaining a new set point for the oxidation air flow. Thus, the increase of gas supply to the SRU is compensated by a higher oxidation air flow.

When a feed gas composition change occurs, such as a higher air demand, the $H_2S$ concentration in the tail gas (FIG. 1, 156) may rise while the tail gas flow may remain the same. An increased $H_2S$ concentration may be detected by the QC analyzer (147) and the amount of oxidation air flow may be increased. The ABC system (200) may apply a correction, causing the H$_2$S concentration to decrease to its set point value, and the amount of oxidation air may be decreased again.

Figure 3:
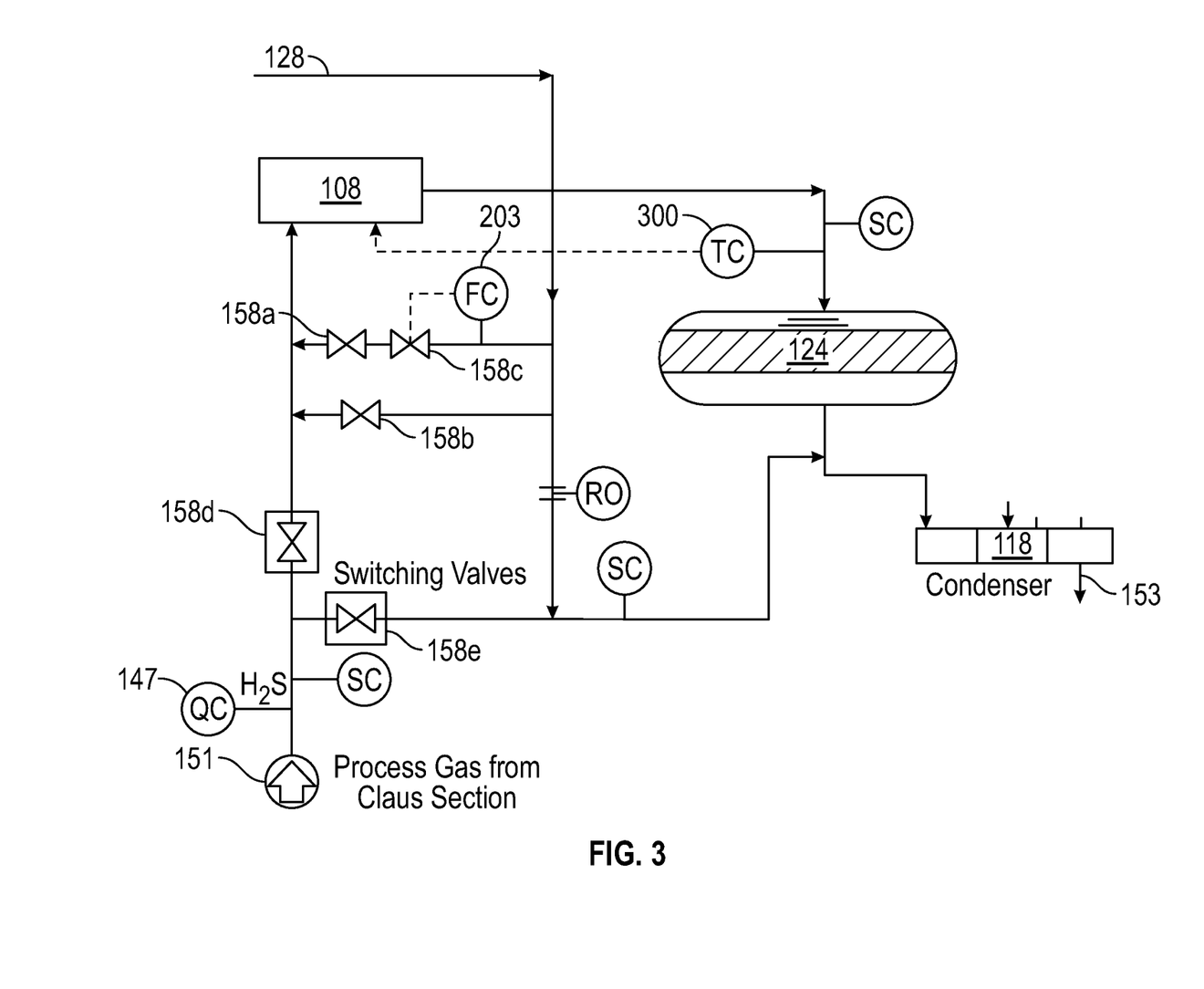
FIG. 3 illustrates an oxidation air control system according to embodiments of the present disclosure.

FIG. 3 illustrates an oxidation air control system according to embodiments of the present disclosure. The modified oxidation air control system maintains an oxidizing environment on the SuperClaus catalyst. The modified oxidation air control system also maintains an optimum oxygen concentration downstream of the SuperClaus converter and prevents consecutive oxidation of sulfur to SO$_2$. Depending on the air pre-heater configuration, SRUs may consist of a single flow control (FC) valve or multiple flow and temperature control (TC) valves on one or more oxidation air lines to the SuperClaus converter (124). During normal operation, all oxidation air flow control valves (158a, 158b, 158c, 158d, 158e) are open a predetermined percent to maintain the required flow as well as temperature (in the case of cold and hot air). In the conventional configuration of an SRU, the oxidation air flow control valves (158a-e) are set to fully open (100%) during auto SuperClaus bypass (i.e., when the train is switched from SuperClaus to Claus mode), which occurs to prevent SuperClaus catalyst de-activation. However, as described above, sudden introduction of oxidation air may cause fire and damage in the SRU. In the modified SRU configuration according to one or more embodiments herein, the SuperClaus oxidation air flow control valve(s) (158a-e) are configured to fully close during SuperClaus to Claus switching in the logic as opposed to the conventional SuperClaus control configuration.

In SRUs having only fired heaters as air pre-heaters, the oxidation air temperature is very high (~650-700° F.), and the required oxidation air temperature for a SuperClaus (SC) reaction downstream of the third stage re-heater (108) is approximately 375-380° F. Therefore, the pre-heated air may be mixed with colder air (approximately 250° F.) from air blowers to achieve the required oxidation (RO) air temperature. In one or more embodiments, there may be oxidation air lines (hot and cold) with oxidation air flow control valve(s) (158a, 158b, 158c), a flow controller (FC) (203) and a temperature controller (TC) (300). In such a configuration, the oxidation air flow control valves (158a, 158b, 158c) located on both lines are configured to close during SuperClaus to Claus switching to prevent oxidation air flow. In other embodiments, there may be only one oxidation air flow control valve to close during SuperClaus to Claus switching. In either scenario, oxidation air flow control valves (158a-e) in all branches of oxidation air connected to the third stage re-heater (108) are configured to close during SuperClaus to Claus switching. Such a default position may prevent sulfur fire, over-heating, and damage of process piping and equipment while still safeguarding the SuperClaus catalyst from deactivation. The modified logic will fully close (100%) the SuperClaus oxidation air flow control valve(s) (158a-e), preventing oxygen from entering the SuperClaus converter (124) during switching until the temperature of the third stage re-heater (108) is determined to be in an acceptable range following switching. This can be accomplished with modified air management at the back-end of the SRU where only selective oxidation reactions are anticipated (i.e., direct conversion of H$_2$S into elemental sulfur on the surface of the SuperClaus catalyst).

With modified air management according to embodiments of this disclosure, the SuperClaus oxidation air flow control valve(s) (158a-e) may be open during normal operation (i.e., SuperClaus mode). The opening percentage of the SuperClaus oxidation air flow control valve(s) (158a-e) may be based on the sulfur feedstock throughput and associated oxygen demand. For example, during normal operation, the valve may be opened 30-60% depending on the acid gas feed rate to the SRU. During SuperClaus bypass (i.e., Super Claus to Claus switching), the oxidation air control system shown in FIG. 3 causes the oxidation air flow control valve(s) (158a-e) to fully close. A non-limiting example of a scenario, or criteria, that may trigger SuperClaus to Claus switching includes high H$_2$S concentration in an inlet process gas, or third heated process gas stream (FIG. 1, 151), to the SuperClaus converter (124) (e.g., above about 1.4 vol. %). High SuperClaus converter bed temperatures may also trigger SuperClaus to Claus switching. Another scenario for triggering the switch is low oxidation air flow. Typically, temperatures above 600-650° F. at the bottom of the SuperClaus converter bed may be considered high. For instance, 650° F. is typically an emergency shutdown point. The low oxidation air flow set point depends on the design conditions of the reactor train. One non-limiting example of a set point is 8237 pounds per hour (lb/hr). The minimum allowable O$_2$ concentration after the SuperClaus stage is 0.1 vol. %.

The SuperClaus oxidation air flow control valve(s) (158a-e) may be controlled by a digital circuit with logic gates that make decisions based on a combination of digital signals from various inputs, such as the ABC system (FIG. 2), or may be controlled manually. For instance, an operator may manually open the one or more oxidation air valves gradually by monitoring the temperature in order to protect catalyst. Following closure of the one or more SuperClaus oxidation air flow control valves (158a-e), a plant operator in the control room console may manually open any SuperClaus oxidation air flow control valve(s) (158a-e) gradually by monitoring the temperature to protect the SuperClaus catalyst from risk of both fire (when oxidation air is fully open) and deactivation (when oxidation air is fully close). Hence, the optimum oxidation air flow will be minimum. Alternatively, the opening of a SuperClaus oxidation air flow control valve (158a-e) may be automated based on appropriate conditions by considering a cascade control between temperature controllers (TC) and flow controllers (FC). In addition to temperature, a tail gas H$_2$S reading (i.e., concentration of process gas entering the SuperClaus converter) and oxidation air flow (i.e., reduced flow resulting from trip of air blowers or closure of upstream valves) may also cause opening or closing of the oxidation air flow control valve(s) (158a-e) during abnormalities, such as instrument failure.

Figure 4:
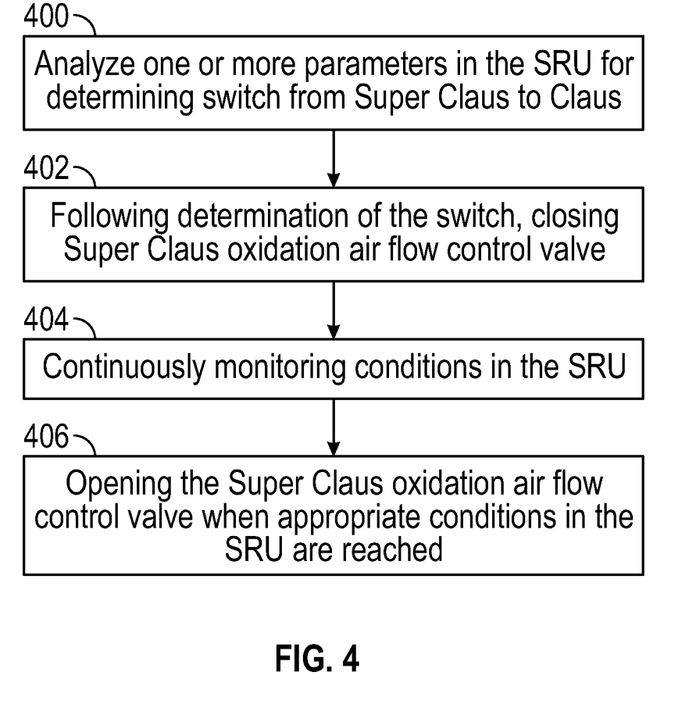
FIG. 4 illustrates a control process for oxidation air management in an SRU according to embodiments of the present disclosure.

FIG. 4 illustrates the main steps in the control process for oxidation air management in an SRU described herein. In an initial step (400) one or more parameters in the SRU are analyzed for determining SuperClaus to Claus switching. In a next step (402), following determination of the switch, the SuperClaus oxidation air flow control valve is closed. Conditions in the SRU are continuously monitored in a subsequent step (404). In a final step (406), the SuperClaus oxidation air flow control valve is opened once appropriate conditions (e.g., range of values, predetermined threshold value) have been reached in the SRU. Monitoring and indication of conditions may be performed by thermocouple temperature transmitters with alarms, flow transmitters with alarms, and/or online tail gas analyzers with alarms.

Figure 5:
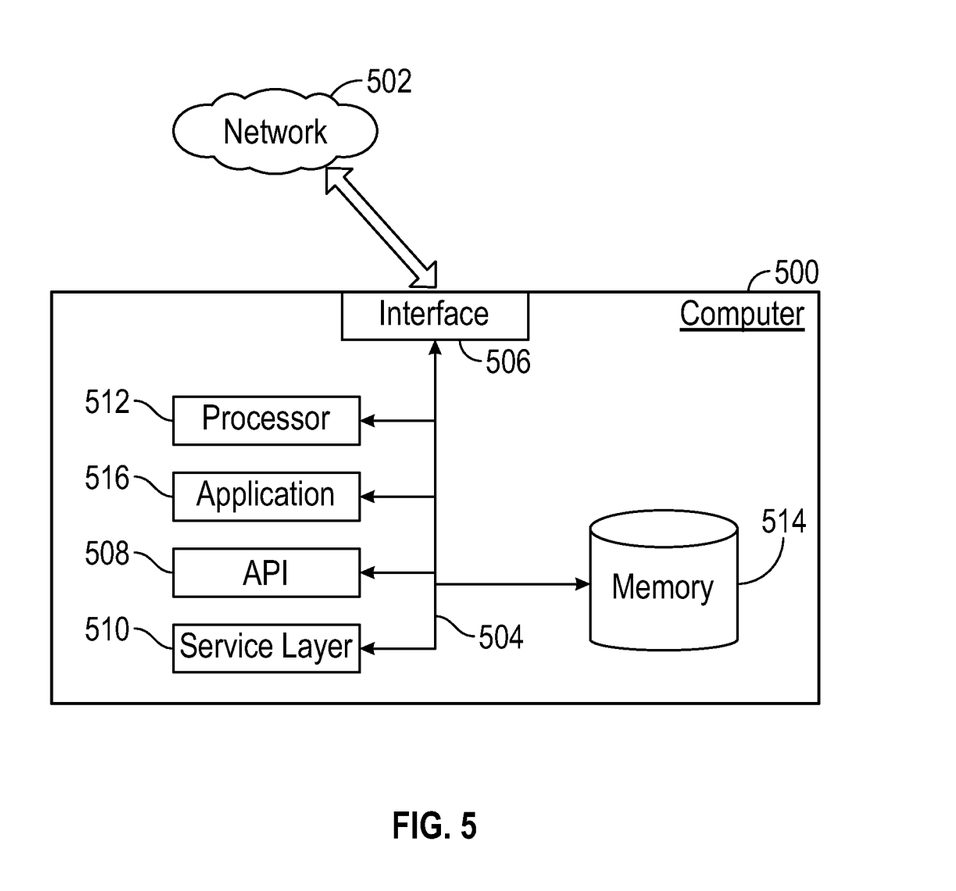
FIG. 5 illustrates a computer system according to embodiments of the present disclosure.

FIG. 5 shows a computer (500) system that may be used in the control process for oxidation air management for automating the opening and closing of the SuperClaus oxidation air flow control valve in accordance with one or more embodiments. Specifically, FIG. 5 shows a block diagram of a computer (500) system used to provide computational functionalities associated with described algorithms, methods, functions, processes, flows, and procedures as described in the instant disclosure, according to an implementation. The illustrated computer (500) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (500) may include a computer that includes an input device, such as a keypad, keyboard, touch screen, or other device that can accept user information, and an output device that conveys information associated with the operation of the computer (500), including digital data, visual, or audio information (or a combination of information), or a GUI.

The computer (500) can serve in a role as a client, network component, a server, a database or other persistency, or any other component (or a combination of roles) of a computer system for performing the subject matter described in the instant disclosure. The illustrated computer (500) is communicably coupled with a network (502). In some implementations, one or more components of the computer (500) may be configured to operate within environments, including cloud-computing-based, local, global, or other environment (or a combination of environments).

At a high level, the computer (500) is an electronic computing device operable to receive, transmit, process, store, or manage data and information associated with the described subject matter. According to some implementations, the computer (500) may also include or be communicably coupled with an application server, e-mail server, web server, caching server, streaming data server, business intelligence (BI) server, or other server (or a combination of servers).

The computer (500) can receive requests over network (502) from a client application (for example, executing on another computer (500)) and responding to the received requests by processing the said requests in an appropriate software application. In addition, requests may also be sent to the computer (500) from internal users (for example, from a command console or by other appropriate access method), external or third-parties, other automated applications, as well as any other appropriate entities, individuals, systems, or computers.

Each of the components of the computer (500) can communicate using a system bus (504). In some implementations, any or all of the components of the computer (500), both hardware or software (or a combination of hardware and software), may interface with each other or the interface (506) (or a combination of both) over the system bus (504) using an application programming interface (API) (508) or a service layer (510) (or a combination of the API (508) and service layer (510). The API (508) may include specifications for routines, data structures, and object classes. The API (508) may be either computer-language independent or dependent and refer to a complete interface, a single function, or even a set of APIs. The service layer (510) provides software services to the computer (500) or other components (whether or not illustrated) that are communicably coupled to the computer (500). The functionality of the computer (500) may be accessible for all service consumers using this service layer (510). Software services, such as those provided by the service layer (510), provide reusable, defined business functionalities through a defined interface. For example, the interface may be software written in JAVA, C++, or other suitable language providing data in extensible markup language (XML) format or other suitable format. While illustrated as an integrated component of the computer (500), alternative implementations may illustrate the API (508) or the service layer (510) as stand-alone components in relation to other components of the computer (500) or other components (whether or not illustrated) that are communicably coupled to the computer (500). Moreover, any or all parts of the API (508) or the service layer (510) may be implemented as child or sub-modules of another software module, enterprise application, or hardware module without departing from the scope of this disclosure.

The computer (500) includes an interface (506). Although illustrated as a single interface (506) in FIG. 5, two or more interfaces (506) may be used according to particular needs, desires, or particular implementations of the computer (500). The interface (506) is used by the computer (500) for communicating with other systems in a distributed environment that are connected to the network (502). Generally, the interface (506) includes logic encoded in software or hardware (or a combination of software and hardware) and operable to communicate with the network (502). More specifically, the interface (506) may include software supporting one or more communication protocols associated with communications such that the network (502) or interface's hardware is operable to communicate physical signals within and outside of the illustrated computer (500).

The computer (500) includes at least one computer processor (512). Although illustrated as a single computer processor (512) in FIG. 5, two or more processors may be used according to particular needs, desires, or particular implementations of the computer (500). Generally, the computer processor (512) executes instructions and manipulates data to perform the operations of the computer (500) and any algorithms, methods, functions, processes, flows, and procedures as described in the instant disclosure.

The computer (500) also includes a non-transitory computer (500) readable medium, or a memory (514), that holds data for the computer (500) or other components (or a combination of both) that can be connected to the network (502). For example, memory (514) can be a database storing data consistent with this disclosure. Although illustrated as a single memory (514) in FIG. 5, two or more memories may be used according to particular needs, desires, or particular implementations of the computer (500) and the described functionality. While memory (514) is illustrated as an integral component of the computer (500), in alternative implementations, memory (514) can be external to the computer (500).

The application (516) is an algorithmic software engine providing functionality according to particular needs, desires, or particular implementations of the computer (500), particularly with respect to functionality described in this disclosure. For example, application (516) can serve as one or more components, modules, applications, etc. Further, although illustrated as a single application (516), the application (516) may be implemented as multiple applications (516) on the computer (500). In addition, although illustrated as integral to the computer (500), in alternative implementations, the application (516) can be external to the computer (500).

There may be any number of computers (500) associated with, or external to, a computer system containing computer (500), each computer (500) communicating over network (502). Further, the term "client," "user," and other appropriate terminology may be used interchangeably as appropriate without departing from the scope of this disclosure. Moreover, this disclosure contemplates that many users may use one computer (500), or that one user may use multiple computers (500).

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A system for oxidation air management in a sulfur recovery unit, comprising:
    a sulfur recovery unit, comprising:
        a gas feedstock inlet configured for receiving a gas feedstock comprising Hydrogen Sulfide ($H_2S$);
        an oxidation air inlet configured for receiving an oxidation air feedstock;
        a plurality of heaters;
        a Claus section comprising:
            a first oxidation air valve connected with the oxidation air inlet, the gas feedstock inlet and the oxidation air inlet being fed to a first combustion reactor configured for combustion of the gas feedstock in a presence of the oxidation air feedstock, producing a first process gas stream;
            a first sulfur condenser configured to condense the first process gas stream, producing a first sulfur stream and a first non-condensed process gas stream;
            a first Claus converter configured to convert the $H_2S$ in the first non-condensed process gas stream to elemental sulfur, producing a second process gas stream;
            a second sulfur condenser configured to condense the second process gas stream, producing a second sulfur stream and a second non-condensed process gas stream;
            a second Claus converter configured convert the $H_2S$ in the second non-condensed process gas stream to elemental sulfur, producing a third process gas stream; and
            a third sulfur condenser configured to condense the third process gas stream, producing a third sulfur stream and a third non-condensed process gas stream; and
        a SuperClaus section following the Claus section, the SuperClaus section comprising:
            a catalyzing SuperClaus converter, a SuperClaus sulfur condenser, and at least one SuperClaus oxidation air flow control valve connected to the oxidation air inlet, the at least one SuperClaus oxidation air flow control valve configured to control introduction of air to the catalyzing SuperClaus converter.

2. The system of claim 1, wherein the Claus section further comprises a first re-heater configured for heating the first non-condensed process gas stream.

3. The system of claim 1, wherein the Claus section further comprises a second re-heater for heating the second non-condensed process gas stream.

4. The system of claim 1, wherein the Claus section further comprises a third re-heater for heating the third non-condensed process gas stream.

5. The system of claim 1, wherein the Claus section further comprises a waste heat boiler configured for cooling the first process gas stream upstream of the first sulfur condenser.

6. The system of claim 1, wherein the at least one SuperClaus oxidation air flow control valve is a temperature control valve.

7. The system of claim 1, wherein the at least one SuperClaus oxidation air flow control valve is a flow control valve.

8. The system of claim 1, further comprising a digital circuit in communication with the sulfur recovery unit.

9. The system of claim 8, wherein the digital circuit is configured to cause closing of the at least one SuperClaus oxidation air flow control valve following a switch from the SuperClaus section to the Claus section of the sulfur recovery unit.

10. A control process for oxidation air management in a sulfur recovery unit, comprising:
    analyzing at least one parameter in the sulfur recovery unit, the sulfur recovery unit comprising:
        a gas feedstock inlet configured for receiving a gas feedstock comprising Hydrogen Sulfide ($H_2S$);
        an oxidation air inlet configured for receiving an oxidation air feedstock; and
        a plurality of heaters;

based on the at least one parameter, determining a switch from a SuperClaus section of the sulfur recovery unit to a Claus section of the sulfur recovery unit, wherein the Claus section comprises:
- a first oxidation air valve connected with the oxidation air inlet, the gas feedstock inlet and the oxidation air inlet being fed to a first combustion reactor configured for combustion of the gas feedstock in a presence of the oxidation air feedstock, producing a first process gas stream;
- a first sulfur condenser configured to condense the first process gas stream, producing a first sulfur stream and a first non-condensed process gas stream;
- a first Claus converter configured to convert the $H_2S$ in the first non-condensed process gas stream to elemental sulfur, producing a second process gas stream;
- a second sulfur condenser configured to condense the second process gas stream, producing a second sulfur stream and a second non-condensed process gas stream;
- a second Claus converter configured convert the $H_2S$ in the second non-condensed process gas stream to elemental sulfur, producing a third process gas stream; and
- a third sulfur condenser configured to condense the third process gas stream, producing a third sulfur stream and a third non-condensed process gas stream, and wherein the SuperClaus section comprises a catalyzing SuperClaus converter, a SuperClaus sulfur condenser, and at least one SuperClaus oxidation air flow control valve connected to the oxidation air inlet;

continuously monitoring at least one condition in the sulfur recovery unit; and when the at least one condition reaches a predetermined threshold or range, opening the at least one SuperClaus oxidation air flow control valve to the SuperClaus section.

11. The control process in accordance with claim 10, wherein the at least one condition is temperature.

12. The control process in accordance with claim 10, wherein the at least one condition is a $H_2S$ concentration in the SuperClaus section.

13. The control process in accordance with claim 10, wherein the at least one condition is an oxidation air flow rate in the SuperClaus section.

14. The control process in accordance with claim 10, wherein the at least one parameter is a predetermined concentration or concentration range of $H_2S$ in the SuperClaus section.

15. The control process in accordance with claim 10, wherein the at least one parameter is a predetermined temperature or temperature range in the SuperClaus section.

16. The control process in accordance with claim 10, wherein the at least one parameter is a predetermined oxidation air flow in the SuperClaus section.

* * * * *